United States Patent [19]

Weaver et al.

[11] 4,228,196

[45] Oct. 14, 1980

[54] PROCESS FOR PREPARING PRECOOKED POTATO PRODUCTS

[75] Inventors: Merle L. Weaver, Martinez; Keng C. Ng, Berkeley, both of Calif.

[73] Assignee: The United States of America as represented by the Secretary of Agriculture, Washington, D.C.

[21] Appl. No.: 81,245

[22] Filed: Oct. 2, 1979

Related U.S. Application Data

[63] Continuation-in-part of Ser. No. 853,717, Nov. 21, 1977, abandoned.

[51] Int. Cl.³ ............................................. A23L 1/216
[52] U.S. Cl. ................................... 426/407; 426/412; 426/428; 426/441; 426/464; 426/509; 426/510; 426/637
[58] Field of Search ............... 426/615, 637, 410, 412, 426/419, 444, 455, 456, 464, 465, 472, 473, 482, 483, 506, 509, 510, 517, 518, 523, 524, 438, 441, 407

[56] References Cited

U.S. PATENT DOCUMENTS

| 2,983,619 | 5/1961 | Shaw et al. | 426/637 X |
|---|---|---|---|
| 3,016,303 | 1/1962 | Cooley | 426/510 X |
| 3,063,849 | 11/1962 | Nelson et al. | 426/637 X |
| 3,573,070 | 3/1971 | Smith et al. | 426/456 X |
| 3,644,129 | 2/1972 | Sloan | 426/509 X |
| 3,959,501 | 5/1976 | Shatila | 426/637 X |
| 3,973,047 | 8/1976 | Linaberry et al. | 426/456 X |
| 4,084,008 | 4/1978 | Yueh et al. | 426/510 X |
| 4,194,016 | 3/1980 | Weaver et al. | 426/637 X |

FOREIGN PATENT DOCUMENTS

| 806128 | 2/1968 | Canada . | |
|---|---|---|---|
| 1245471 | 9/1971 | United Kingdom | 426/412 |

OTHER PUBLICATIONS

Nelson et al., "Retorting Foods in Plastic Bags", Food Engineering, Jan. 1956, pp. 92, 93, 140 & 143; 426-412.

*Primary Examiner*—Arthur L. Corbin
*Attorney, Agent, or Firm*—M. Howard Silverstein; David G. McConnell; Theodore J. Leitereg

[57] ABSTRACT

Precooked potato products are prepared by a process wherein the potatoes are washed, peeled, and treated whole or cut into pieces. The so-prepared potatoes are cooked at a temperature below the temperature at which sloughing of the potato surface would occur if the whole potato were cooked to its center at that temperature. Then, the potatoes are heated in air and cooked again at a temperature of about 50° to 100° C. Following the last cooking procedure the potatoes are frozen, chilled, or retorted to preserve them in the absence of starch suspensions. To prepare them for consumption the potatoes can be fried or boiled.

4 Claims, No Drawings

PROCESS FOR PREPARING PRECOOKED POTATO PRODUCTS

CROSS-REFERENCE TO RELATED APPLICATION

This is a continuation-in-part of our co-pending application, Ser. No. 853,717, filed Nov. 21, 1977, now abandoned.

BACKGROUND OF THE INVENTION

1. Field of the Invention

This invention relates to and has among its objects the provision of novel potato products and novel processes for making them. It is a particular object of the invention to provide a precooked, non-par-fried potato piece, such as a French-fried potato, shoestring potato, and the like, which subsequently can be finish-cooked prior to consumption. It is another object of the invention to prepare a precooked boiling potato which can be finish-cooked by boiling in water.

Further objects of the invention will be evident from the following description wherein parts and percentages are by weight unless otherwise specified. Texture here relates to the surface layer of the strip and also includes the center. Good quality fried potato strips are rigid with a crisp surface layer and a firm but mealy inner core. Rigidity concerns the ability of the finished product to resist bending and is thus distinguished from texture. A thick, leathery surface can impart rigidity to a fry. It should be obvious that a crisp, rigid, rather than a leathery, rigid, finished fry is preferred. The terms "fat" and "oil" are used synonymously herein as designating an edible glyceride whether normally solid or liquid.

2. Description of the Prior Art

Most restaurants, including the large franchise chains prefer to prepare their French-fried potatoes from the frozen or chilled par-fried product rather than to go through the cumbersome procedure of preparing French fries from raw potatoes. Although these par-fried products offer convenience and savings in labor costs one problem which has beset the industry is that when the products are prepared for the table (either by oven heating or by deep-fat frying), they are unstable as to texture. Immediately after removal from the oven or deep-fat fryer, the potato strips have a desirable crisp texture, but as they cool they become limp and soggy. This problem is particularly acute in large restaurant operations. Guests who receive the first portions of each batch enjoy French fries of desirable crisp texture, whereas others who receive subsequent portions of the batches can only contemplate with dismay the soggy, limp strips on their plates.

Standard commercial French-fried potato products are par-fried prior to distribution. To prepare them for the table the product is given a finish-fry. The double frying increases the fat content of the French-fried product. Although some fat is necessary for the characteristic flavor of the French-fries, excessive fat is to be avoided for dietary and other reasons.

French-fried potatoes for home consumption are usually prepared by cutting raw potatoes into strips, blanching the potatoes in hot water, par-frying the potato strips in oil, and then preserving the strips by chilling or freezing them. To prepare them for consumption the French-fried potatoes are either baked in ovens or finish-fried in oil.

Potatoes, especially high solids tubers, tend to fall apart or slough when they are retorted in cans or pouches or when they are prepared for consumption by boiling. Thus, the types of potatoes that can be used for soups, stews, salads, whole-boiling potatoes, or the like, are limited to low-solids varieties.

In co-pending application Ser. No. 803,193, filed June 3, 1977, by Ng et al, now abandoned, a procedure for preparing precooked baking potatoes is described. Potatoes are cooked to their centers without damage to their surface tissue. An important feature of the cooking is that the temperature thereof for a part of the time, be above the temperature at which sloughing of the potato surface would occur if the potatoes were cooked to their centers at that temperature. Following the cooking procedure the potatoes are heated in air and then frozen or chilled to preserve them. It is noted in the application that the abovedescribed method cannot be used to prepare French-fried potatoes.

In another co-pending application Ser. No. 809,355, filed June 23, 1977, by Weaver et al, now abandoned, there is disclosed a process for making precooked fruits and vegetables. Potatoes, for example, are cooked to their centers at a temperature below the temperature at which sloughing of the surface tissue would occur if the potatoes were cooked to their centers at that temperature. Then, the so-treated potatoes are heated in air and then frozen or chilled to preserve them. It is noted also in this application that the method described therein cannot be used to prepare French-fried potatoes.

Finally, a process for preparing French-fried potatoes is described by Strong in Canadian Pat. No. 806,128, issued Feb. 11, 1969. In the patented process potato strips are blanched until all portions receive enough heat to turn them to a generally translucent condition throughout. The blanching may be conducted using steam for 2 to 10 minutes or hot water at 71°–93° C. for 3 to 8 minutes. The blanched strips are dehydrated in hot air at 65°–177° C. for 5 to 20 minutes to a moisture reduction of 20 to 30% of their initial weight. Then, the strips are par-fried at 149°–191° C. for 15 to 60 seconds and then frozen to preserve them.

The process of Strong has certain disadvantages, however. From an economic standpoint, the Strong process requires considerable expenditure of energy and money in the heating and par-frying steps. In addition, the texture of the final product is unpredictable in many instances the product is puffed and blistered. Furthermore, if the potatoes employed in the Strong process are high in reducing sugars, a lengthy preconditioning step is necessary to obtain an acceptable product.

SUMMARY OF THE INVENTION

The invention described herein provides a means for preparing precooked potato products, such as non-par-fried, French-fried potato pieces, and the like, of excellent texture, color and flavor. In addition, precooked boiling potatoes from both high and low solids potatoes can be prepared by the method of the invention. In the process of the invention whole potatoes or potato pieces are cooked at a temperature below that at which sloughing of the potato surface would occur if the whole potato were cooked to its center at that temperature. Following the cooking step, the potatoes are heated in air. Then, the so-heated potatoes are subjected to a second cooking step and frozen, chilled, or retorted to preserve them in the absence of starch suspensions.

One important advantage of the invention is that the finish-fried potato product possesses a uniform texture and freshly-fried flavor equivalent to that of a freshly cut and fried potato piece. Known commercial methods are unable to yield a non-par-fried product exhibiting these qualities.

Another advantage of the process of the invention is that it yields a product of uniform color and texture. Freshly-cut and fried potato pieces generally do not possess uniform color and texture throughout the year because raw tubers vary in sugar content and solids content at different times after harvest. The finish-fried products prepared in accordance with the invention exhibit an excellent uniform golden brown color. They have a crisp exterior, a firm, but mealy interior, and maintain their rigidity for long periods of time after they are finish-fried.

A further advantage of the invention is the elimination of the par-frying step prior to freezing or chilling. As explained above, commercial products are par-fried at the processing plant. The method of the invention avoids a par-frying step of this nature. This reduces the capital investment and removes the expenses associated with frying in oil heretofor encountered by the processing industry. Furthermore, the finish-fried potato product contains less oil because of the surface produced during the process of the invention and because only one frying step is applied to the potato piece. The storage life of the product is increased as a result of the absence of a par-frying step. Finally, the surface of the finish-fried product is crisp, does not appear to be soaked with oil, and is not shriveled.

DESCRIPTION OF THE PREFERRED EMBODIMENTS

The process of the invention will next be described in detail with emphasis on preparing a precooked, non-par-fried, French-fried potato piece. It should be noted that a precooked boiling potato can be prepared according to the same process. However, potatoes may be cut into pieces or left whole depending on the type of product desired.

In the process of the invention raw potatoes are peeled and then cut into pieces of about 0.6 to 1.3 centimeters square and about 10 centimeters long. The potato pieces are then subjected to a cooking step, the temperature and length of this cooking step being dependent upon the size of the potato pieces to be treated. In this step the potato pieces are cooked with either water or steam, or a combination of both, at a temperature below the temperature at which sloughing of the surface tissue would occur if the whole potatoes were cooked to their centers at that temperature. Generally, for potatoes this temperature is about 81°-83° C. The pieces are heated until they are cooked to the center, and often longer i.e., for a period of about 5 to 45 minutes. The usual mode of cooking potatoes in water involves immersing the potatoes therein at the proper temperature. Alternatively, steam can be applied to the potatoes at the desired temperature, and at atmospheric or superatmospheric pressure.

It must be emphasized that the duration of the cooking step is dependent upon the size of the potato pieces, maturity, and composition of potato used. Exact conditions for a particular lot of potatoes can be determined using pilot trails in accordance with the process and rationale of the invention.

The so-cooked potatoes are next heated (dried) in air, preferably at a temperature of about 66° to 93° C. for about 5 to 30 minutes. During this period the moisture content of the potatoes is generally reduced about 10 to 60%, depending upon the temperature, the time, the air flow, and the size, type, and composition of the potato piece. The heating step is usually carried out immediately after the cooking step. However, the cooked potatoes may stand for several minutes to several hours before being heated with no deleterious effects on the quality of the product.

It should be noted that the heating step is critical to the method of the invention. By application of heat the retrogradation of starch is promoted. Further, the texture and flavor of the final product is enhanced. However, although it appears that the reduction of moisture content is responsible for the improved texture, it may be that the important feature is solely the application of heat regardless of the extent of moisture removal. In any event, the heating step must be employed to obtain a good quality potato product.

Next, the cooked and heated potato pieces are again subjected to a cooking period. The temperature employed during this cooking step is dependent on the preservation technique employed on the product to maintain it until it is finish-cooked, but is generally within the range of about 50°-100° C. If the product is to be frozen or retorted to preserve it, the temperature of the second cooking must be below 81°-83° C., i.e., the temperature at which sloughing of surface tissue would occur if the whole potato were cooked to its center at that temperature. On the other hand, if the product is chilled until it is finish-cooked, the temperature of the second cooking can be from about 50° to 100° C. It should be noted, however, that the exterior and interior texture of the potato piece changes with change in temperature in the second cook. The second cooking step is otherwise similar to the above-mentioned first cooking step: either water or steam or both can be employed as the cooking medium. The second cooking period is from about 5 to 45 minutes, preferably 5 to 30 minutes. The period is dependent on the texture and flavor desired in the finish-cooked product, the temperature, the characteristics of the raw material, such as sugar content, and the nature of the heating-in-air step. Again, pilot trials can be used to ascertain the proper conditions. It should be noted that the second cooking procedure is a necessary one. If the step is omitted, the resulting product will be inferior in flavor and texture and will puff and blister if fried.

It is necessary to equilibrate the product if the second cooking step is conducted above 81°-83° C. Usually, the product, after the second cooking step, is held at a temperature of about 1° to 25° C. for a period of about 2 to 24 hours. Longer equilibration times will not add to or subtract from the quality of the product. The equilibration time depends on the type of product being made, the solids content of the potatoes, and the temperature employed.

Following the second cooking step the potatoes are treated to preserve them. Usually, the so-prepared products are frozen and then packaged for retail sale or institutional use. The potatoes can be frozen in any conventional manner including refrigeration rooms, blast freezing, and the like. It may be desirable to remove surface water by blowing, shaking, or the like, prior to freezing the product. The prepared product can also be chilled at about 0.5° to 8.0° C. to preserve it for future use. Finally, the so-prepared potatoes may be placed in cans or plastic pouches and then retorted as a preservation means.

It may be necessary in conjunction with the process of the invention to treat the so-cooked and so-heated potatoes to prevent after-cooking darkening. Any conventional technique may be used to this end. For example, the potatoes can be dipped, after the first or second cook, or both, in dilute aqueous solutions of citric acid, sodium acid pyrophosphate, sodium bisulfite, and the like.

To prepare them for consumption the products of the invention are fried in hot oil to the desired level of crispness and color. In general, the potato pieces are contacted with the oil at a temperature of about 177° to 191° C. for a period of about 2 to 4 minutes. The so-prepared potatoes exhibit the appearance, flavor, and texture of a freshly-cut and fried potato piece.

A par-frying step is not necessary in the process of the invention. However, it may be desirable to par-fry the products of the invention in hot oil prior to preserving them. For example, in the event that the product of the invention is to be finish-cooked by baking in an oven, the product necessarily would have to be par-fried prior to freezing or chilling for the purpose of preservation. Otherwise, the final product would not have the characteristic of a fried potato piece.

Excellent fried potato pieces of the nature of French-fried potatoes can be prepared by the process of the invention. It should be emphasized, however, that thin-sliced or shredded potatoes of the nature of hash-brown potatoes cannot be prepared according to the aforementioned procedure unless the product treated in accordance with the invention is equilibrated for a period of about 12-48 hours at a temperature of about 1° to 25° C. Further, fried potatoes prepared by the process of the invention can be baked to finish-cook them provided they are first par-fried in hot oil.

It is within the compass of the invention to finish-cook potatoes prepared in accordance with its teaching by boiling in water. Thus, the so-prepared potatoes can be employed in salads and in soups and stews, which require long cooking periods. It is noteworthy that the potatoes of the invention do not slough or disintegrate when subjected to boiling for extended periods. Generally, the potatoes are boiled in water for 15 to 30 minutes at a temperature of about 90°-100° C. in order to finish-cook them. The finish-cooking time will vary with the size and type of potato piece and with the manner in which they are preserved. The final product has the appearance, flavor, and texture of a freshly boiled product.

EXAMPLES

The invention is further demonstrated by the following illustrative examples. Some of the experiments are not in accordance with the invention but are provided for purposes of comparison. Preservation was conducted in the absence of starch suspensions.

EXAMPLE 1

Raw potatoes (Russet Burbank variety) were washed, peeled, and cut into pieces 0.95 cm. square and 10 cm. in length. The potato pieces were then subjected to a cooking step using either water or steam, or a combination of both. Water cooking was conducted by immersing the potato pieces in water. Steam cooking was accomplished by exposing the pieces to steam at the desired temperature. Next, the potato pieces were heated in air by placing them in a forced-air oven. Then, the so-heated pieces were again cooked in either water or steam or a combination of both as described above. The above procedure was repeated at varying times and temperatures.

Potato pieces from each treatment were divided into two lots, one of which was frozen, the other chilled. The so-prepared products were finish-cooked by frying in oil at a temperature of 185° C. for 2.5 minutes.

The experiments and results are summarized in the following table.

| | First Cook | | | Heat | | Second Cook | | | Quality on Finish-cooking | | |
|---|---|---|---|---|---|---|---|---|---|---|---|
| Run | Medium | Temp (°C.) | Time (min.) | Temp (°C.) | Time (min.) | Medium | Temp (°C.) | Time (min.) | Texture | Flavor | Color |
| 1 | Water | 71 | 10 | 66 | 10 | Steam | 71 | 20 | crisp exterior, firm mealy interior, whether frozen or chilled. | freshly-cut and fried | uniform |
| | Steam | 71 | 20 | | | | | | | | |
| 2 | Water | 71 | 10 | 66 | 10 | Steam | 71 | 20 | crisp exterior, firm mealy interior, whether frozen or chilled. | freshly-cut and fried | " |
| | Steam | 71 | 10 | | | | | | | | |
| 3 | Water | 71 | 10 | 66 | 5 | Steam | 71 | 15 | crisp exterior, firm mealy interior, whether frozen or chilled. | freshly-cut and fried | " |
| | Steam | 71 | 10 | | | | | | | | |
| 4 | Water | 71 | 5 | 66 | 10 | Steam | 71 | 20 | crisp exterior, firm mealy interior, whether frozen or chilled | freshly-cut and fried | " |
| | Steam | 71 | 10 | | | | | | | | |
| 5 | Steam | 71 | 10 | 66 | 10 | Steam | 71 | 20 | crisp exterior, firm mealy interior, whether frozen or chilled | freshly-cut and fried | " |
| | Water | 71 | 10 | | | | | | | | |
| 6 | Steam | 71 | 20 | 66 | 10 | Water | 71 | 10 | crisp exterior, firm mealy interior, whether frozen or chilled | freshly-cut and fried | " |
| | | | | | | Steam | 71 | 10 | | | |
| 7[a] | Water | 71 | 10 | 66 | 10 | Steam | 100 | 3 | not crisp, oil-soaked, soft, blistered and puffed surface when frozen; soft, mealy interior, puffed surface, softens rapidly when chilled. | fair | " |
| | Steam | 100 | 4 | | | | | | | | |
| 8[a] | Water | 71 | 10 | 66 | 5 | Steam | 100 | 4 | not crisp, oil-soaked, | " | " |

-continued

| Run | First Cook Medium | Temp (°C.) | Time (min.) | Heat Temp (°C.) | Time (min.) | Second Cook Medium | Temp (°C.) | Time (min.) | Quality on Finish-cooking Texture | Flavor | Color |
|---|---|---|---|---|---|---|---|---|---|---|---|
| | Steam | 82 | 15 | | | | | | soft, blistered and puffed surface when frozen; soft, mealy interior, puffed surface softens rapidly when chilled | | |
| 9[a] | Water | 71 | 10 | 66 | 10 | Steam | 82 | 8 | not crisp, oil-soaked, soft, blistered and puffed surface when frozen; soft, mealy interior, puffed surface, chilled. | fair | uniform |
| | Steam | 82 | 15 | | | | | | | | |
| 10[a] | Water | 77 | 30 | — | — | — | — | — | not crisp, shrivels and softens rapidly, soft mealy interior. | poor (washed-out) | " |
| 11[a] | Steam | 100 | 10 | 66 | 15 | Water | 71 | 15 | not crisp nor rigid, puffed and blistered when frozen; oil-soaked. | poor (washed-out) | blotchy |
| 12[a] | Water | 71 | 10 | 66 | 15 | — | — | — | not crips nor rigid, puffed and blistered. | fair | uniform |
| 13[a] | Water | 71 | 10 | 66 | 15 | — | — | — | not crisp nor rigid, puffed, blistered, and oil-soaked surface. | " | " |
| | Steam | 71 | 30 | | | | | | | | |
| 14[a] | Steam | 71 | 30 | — | — | Steam | 100 | 5 | not crisp nor rigid, puffed, blistered, and oil-soaked surface. | " | " |

[a]Not in accordance with the invention but provided for purposes of comparison.

EXAMPLE 2

The procedure of Example 1 was followed. After the second cooking step, but prior to either freezing or chilling, the products were par-fried in oil at 185° C. To prepare them for consumption the potato pieces were either finish-fried in oil at about 185° C. for 2.5 minutes, or baked in an oven at 218° C. for 12 minutes. The results are tabularized in the following table.

| Run | First Cook Medium | Temp (°C.) | Time (min.) | Heat Temp (°C.) | Time (min.) | Second Cook Medium | Temp (°C.) | Time (min.) | Par-fry Time (sec.) | Finish-cook | Quality After Finish-cooking Texture | Flavor | Color |
|---|---|---|---|---|---|---|---|---|---|---|---|---|---|
| 15 | Water | 71 | 10 | 66 | 10 | Steam | 71 | 15 | 60 | Hot oil | crisp exterior, firm, mealy interior | freshly-cut and fried | uniform |
| | Steam | 71 | 15 | | | | | | | | | | |
| 16 | Water | 71 | 10 | 66 | 10 | Steam | 71 | 15 | 12C | Oven | crisp exterior, firm, mealy interior | freshly-cut and fried | " |

EXAMPLE 3

The procedure outlined in Example 1 was followed. In some runs after the second cooking step potato pieces were placed in plastic pouches, which were then sealed. The pouches containing the potato strips were retorted at 121° C. for 15 minutes at a pressure of 15 psig.

In other runs potato strips were frozen immediately after the second cook or were held at about 5° C. for 16 hours.

The products in all runs were prepared for consumption by frying for 3 minutes in oil at about 186° C.

The results are summarized in the following table.

| Run | First Cook Medium | Temp (°C.) | Time (min.) | Heat Temp (°C.) | Time (min.) | Second Cook Medium | Temp (°C.) | Time (min.) | Preservation | Quality After Finish-frying Texture | Flavor | Color |
|---|---|---|---|---|---|---|---|---|---|---|---|---|
| 17 | Steam | 71 | 30 | 66 | 15 | Steam | 71 | 6 | Retort | crisp surface, firm, mealy interior | very good | uniform |
| 18 | Steam | 71 | 30 | 66 | 15 | Steam | 71 | 5 | Freeze | crisp surface, firm mealy interior | " | " |
| 19 | Steam | 71 | 30 | 66 | 15 | Steam | 71 | 5 | Chill | crisp surface, firm mealy interior | " | " |
| 20[a] | Steam | 71 | 30 | — | — | — | — | — | Retort | sloughing surface, soft interior | flat, washed-out flavor | " |

[a]Not in accordance with the invention but provided for purposes of comparison.

EXAMPLE 4

Potato pieces were treated according to the general procedure outlined in Example 1. One half of the potato pieces was frozen immediately after the second cook, the other half was held at 0.5° C. for 12 hours after the second cook. To finish-cook them the pieces were fried for 3 minutes in oil at 186° C. The results are summarized in the following table.

| | First Cook | | | Heat | | Second Cook | | | | Quality After Finish-cooking | | |
|---|---|---|---|---|---|---|---|---|---|---|---|---|
| Run | Medium | Temp (°C.) | Time (min.) | Temp (°C.) | Time (min.) | Medium | Temp (°C.) | Time (min.) | Preservation | Texture | Flavor | Color |
| 21 | Water Steam | 71 71 | 10 15 | 66 | 10 | Steam | 100 | 3 | Chilled | crisp surface, firm mealy interior. | good | uniform |
| 22 | Water Steam | 71 71 | 10 15 | 66 | 10 | Steam | 100 | 3 | Frozen | puffed, blistered, oil-soaked, softens rapidly. | poor | " |

EXAMPLE 5

Whole potatoes and potato pieces were treated as in Example 1. After the second cook whole potatoes were placed in cans (#303) or in plastic pouches, sealed, and retorted at 121° C. for 15 minutes (pouches) and 30 minutes (cans) at a pressure of 15 psig. In other runs the potatoes were frozen immediately after the second cook or were held at about 5° C. for 16 hours. All products were prepared for consumption by boiling in water for 30 minutes. The results are tabularized below.

| | | First Cook | | | Heat | | Second Cook | | | | Quality After Finish-cooked | |
|---|---|---|---|---|---|---|---|---|---|---|---|---|
| Run | Potato product | Medium | Temp (°C.) | Time (min.) | Temp (°C.) | Time (min.) | Medium | Temp (°C.) | Time (min.) | Preservation | Texture | Flavor |
| 23 | whole | Steam | 71 | 30 | 66 | 15 | Water | 71 | 15 | Retort (plastic) | firm, no sloughing | good |
| 24[a] | whole | Steam | 71 | 30 | — | — | — | — | — | Retort (plastic) | cracked and sloughing | flat, washed-out |
| 25 | whole | Steam | 71 | 30 | 66 | 15 | Water | 71 | 15 | Retort (cans) | firm, no sloughing | good |
| 26[a] | whole | Steam | 71 | 30 | — | — | — | — | — | Retort (cans) | cracked and sloughing | flat, washed-out |
| 27 | whole | Steam | 71 | 30 | 66 | 15 | Steam | 71 | 15 | Frozen | firm, no sloughing | good |
| 28 | whole | Steam | 71 | 30 | 66 | 15 | Steam | 71 | 15 | Chilled | firm, no sloughing | " |
| 29 | dices (0.95 cm square) | Steam | 71 | 30 | 66 | 10 | Steam | 71 | 8 | Frozen | firm, no sloughing | " |
| 30 | dices (0.95 cm square) | Steam | 71 | 30 | 66 | 10 | Steam | 71 | 8 | Chilled | firm, no sloughing | " |

[a]Not in accordance with the invention but provided for the purpose of comparison.

EXAMPLE 6

Raw potatoes (Russet Burbank variety) were washed, peeled, and cut into pieces 0.95 cm square and 10 cm in length. The potato pieces were then immersed in water at 82° C. and held in the water at 71° C. for 15 minutes. The strips were removed from the water and held in air at 23° C. for 10 minutes. Next, the potatoes were immersed in water at 71° C. for 5 minutes.

One half (31 of the lot treated as above was frozen immediately in a blast freezer; the remainder (32) was dried in air at 62° C. for 10 minutes and then frozen in a blast freezer. The so-prepared products were finish-cooked by frying in oil at a temperature of 185° C. for 2.5 minutes.

In another experiment raw potatoes of the same variety were washed, peeled, and cut into pieces as above. The potatoes were placed in water at 71° C. for 10 minutes and treated with steam at 71° C. for 15 minutes. Then, the pieces were heated in air at 62° C. for 10 minutes, placed in water at 71° C. for 5 minutes, and frozen in a blast freezer. The frozen potato pieces (33) were fried in oil at 185° C. for 2.5 minutes.

Runs 31 and 32 are in accordance with the procedure of Sloan in U.S. Pat. No. 3,644,129. Run 33 is an embodiment of the above-disclosed method. The results are summarized below.

| | First Cook | | | Heat | | Second Cook | | | Heat | | Quality on Finish-cooking | | |
|---|---|---|---|---|---|---|---|---|---|---|---|---|---|
| Run | Medium | Temp (°C.) | Time (min) | Temp (°C.) | Time (min) | Medium | Temp (°C.) | Time (min) | Temp (°C.) | Time (min) | Texture | Flavor | Color |
| 31 | Water | 82 71 | 15 | 23 | 10 | Water | 71 | 5 | — | — | Not crisp nor rigid, softens rapidly, soft, mealy interior, oil soaked. | Poor | Blotchy |
| 32 | Water | 82 71 | 15 | 23 | 10 | Water | 71 | 5 | 62 | 10 | Not crisp nor rigid, puffed and blistered, oil soaked. | Poor | Fair |

-continued

| Run | First Cook Medium | Temp (°C.) | Time (min) | Heat Temp (°C.) | Heat Time (min) | Second Cook Medium | Temp (°C.) | Time (min) | Heat Temp (°C.) | Heat Time (min) | Quality on Finish-cooking Texture | Flavor | Color |
|---|---|---|---|---|---|---|---|---|---|---|---|---|---|
| 33 | Water Steam | 71 71 | 10 15 | 62 | 10 | Water | 71 | 5 | — | — | Crisp exterior, firm mealy interior. | Freshly cut and fried | Uniform |

EXAMPLE 7

Raw potatoes (Russet Burbank variety) were washed, peeled, and cut into pieces 0.95 cm square and 10 cm in length. The potato pieces were then immersed in water at 71° C. for 15 minutes. The strips were removed from the water and held in air at 27° C. for 30 minutes. Next, the potatoes were immersed in water at 71° C. for 5 minutes.

One half (34) of the lot treated as above was frozen immediately in a blast freezer; the remainder (35) was dried in air at 66° C. for 30 minutes and then frozen in a blast freezer. The so-prepared products were finish-cooked by frying in oil at a temperature of 185° C. for 2.5 minutes.

In another experiment raw potatoes of the same variety were washed, peeled, and cut into pieces as above. The potatoes were placed in water at 71° C. for 15 minutes, heated in air at 66° C. for 30 minutes, placed in water at 71° C. for 5 minutes, and frozen in a blast freezer. The frozen potato pieces (36) were fried in oil at 185° C. for 2.5 minutes.

Experiments 34 and 35 are in accordance with the procedure of Sloan in U.S. Pat. No. 3,644,129. Experiment (36) is an embodiment of the method in accordance with the instant invention. The results are summarized below.

EXAMPLE 8

Raw potatoes (Russet Burbank variety) were washed, peeled, and cut into pieces 0.95 cm square and 10 cm in length. The potato pieces were then immersed in water at 71° C. for 30 minutes. The strips were removed from the water and held in air at 27° C. for 30 minutes. Next, the potatoes were immersed in water at 71° C. for 5 minutes.

The entire lot treated as above was frozen immediately in a blast freezer in the absence of starch suspensions. One half (38) of the frozen lot was dried in air at 66° C. to a moisture content of 7% and then reconstituted in boiling water. Both lots (lot 37 and lot 38) from above were finish-cooked by frying in oil at a temperature of 186° C. for 3.5 minutes.

In another experiment raw potatoes of the same variety were washed, peeled, and cut into pieces as above. The potatoes were placed in water at 71° C. for 30 minutes, heated in air at 66° C. for 30 minutes, placed in water at 71° C. for a 5 minutes, and frozen in a blast freezer in the absence of starch suspensions. One half (lot 39) of the frozen potato pieces was fried in oil at 186° C. for 3.5 minutes. The other half (lot 40) was dried in air at 66° C. to a moisture content of 7%, reconstituted in boiling water, and then fried in oil as above.

Experiments with lots 37 and 38 are in accordance with the procedure of Sloan in U.S. Pat. No. 3,644,129. The experiment with lot 39 is an embodiment of the method disclosed in the instant application. The lot 40 potatoes are not within the scope of the above application. The results are summarized in the following table.

| Run | First cook Medium | Temp (°C.) | Time (min) | Heat Temp (°C.) | Heat Time (min) | Second cook Medium | Temp (°C.) | Time (min) | Heat Temp (°C.) | Heat Time (min) | Quality on Finish-cooking Texture | Flavor | Color |
|---|---|---|---|---|---|---|---|---|---|---|---|---|---|
| 34 | Water | 71 | 15 | 27 | 30 | Water | 71 | 5 | — | — | Not crisp nor rigid, softens rapidly, soft, mealy interior, oil soaked. | Poor | Blotchy |
| 35 | Water | 71 | 15 | 27 | 30 | Water | 71 | 5 | 66 | 30 | Tough skin, not crisp nor rigid, puffed and blistered, oil soaked. | Poor | Fair |
| 36 | Water | 71 | 15 | 66 | 30 | Water | 71 | 5 | — | — | Crisp exterior, firm mealy interior. | Freshly | Uniform |

| Lot | First Cook Temp (°C.) | Time (min) | Heat Temp (°C.) | Time (min) | Second Cook Temp (°C.) | Time (min) | Frozen in blast freezer | Heat in air at 66° C. to 7% moisture level | Reconstituted in boiling water | Quality on Finish-cooking Texture | Flavor | Color |
|---|---|---|---|---|---|---|---|---|---|---|---|---|
| 37 | 71 | 30 | 27 | 30 | 71 | 5 | Yes | No | No | Not crisp nor rigid, softens rapidly, oil-soaked soft mealy interior | Poor | Blotchy |
| 38 | 71 | 30 | 27 | 30 | 71 | 5. | Yes | Yes | Yes | Crisp, rigid, hollow interior, | None | Poor |

-continued

| Lot | First Cook Temp (°C.) | First Cook Time (min) | Heat Temp (°C.) | Heat Time (min) | Second Cook Temp (°C.) | Second Cook Time (min) | Frozen in blast freezer | Heat in air at 66° C. to 7% moisture level | Reconstituted in boiling water | Quality on Finish-cooking Texture | Flavor | Color |
|---|---|---|---|---|---|---|---|---|---|---|---|---|
| 39 | 71 | 30 | 66 | 30 | 71 | 5 | Yes | No | No | chip-like. Crisp exterior, rigid, firm, mealy interior. | Fried | Uniform |
| 40 | 71 | 30 | 66 | 30 | 71 | 5 | Yes | Yes | Yes | Crisp, rigid, hollow interior, chip-like. | None | Poor |

EXAMPLE 9

In another set of experiments raw potatoes were washed, peeled and cut into pieces 0.95 cm square and 10 cm in length. The potato pieces (lot 41) were immersed in water at 71° C. for 30 minutes. The strips were removed from the water and heated in air at 66° C. for 15 minutes, placed in water at 71° C. for 15 minutes, and frozen in a blast freezer in the absence of starch suspensions.

The above procedure was repeated on another lot (42) of potatoes with the exception that the second treatment with water at 71° C. for 15 minutes was omitted.

The potatoes of lots 41 and 42 were finish-cooked by frying in oil at a temperature of 186° C. for 4.0 minutes.

The results are summarized below. The potatoes of lot 41 are in accordance with the instant method; those of lot 42 are in accordance with the process disclosed in Ser. No. 941,340.

Having thus described our invention, we claim:

1. A process for preparing precooked non-par-fried French-fry potato products, which comprises
    (a) washing and peeling raw potatoes,
    (b) cutting the raw potatoes into French-fry pieces,
    (c) cooking the raw potato pieces at a temperature below the temperature at which sloughing of the potato surface would occur if the whole potato were cooked to its center at that temperature, said sloughing occurring at a temperature of about 81°–83° C. for a period of 5 to 45 minutes,
    (d) heating the so-cooked potato pieces of step c in air at a temperature of about 66°–93° C. for a period of about 5 to 30 minutes to reduce the moisture content thereof about 10 to 60%,
    (e) cooking the potato pieces of step d at a temperature of about 50° to 100° C. for a period of about 5 to 45 minutes, and then
    (f) preserving the so-cooked potatoes in the absence of starch suspensions.

2. The process of claim 1 wherein the potato pieces are frozen to preserve them, and the temperature of the cooking in step e is below the temperature at which sloughing of the potato surface would occur if the whole potato were cooked to its center at that temperature, said sloughing occurring at a temperature of about 81° to 83° C.

3. The process of claim 1 wherein the potato pieces are chilled to preserve them.

4. The process of claim 1 wherein the potato pieces are retorted to preserve them, and the temperature of the cooking in step e is below the temperature at which sloughing of the potato surface would occur if the whole potato were cooked to its center at that temperature, said sloughing occurring at a temperature of about 81° to 83° C.

| Lot | First Cook Medium | First Cook Temp (°C.) | First Cook Time (min) | Heat Temp (°C.) | Heat Time (min) | Second Cook Medium | Second Cook Temp (°C.) | Second Cook Time (min) | Quality on Finish-cooking Texture | Flavor | Color |
|---|---|---|---|---|---|---|---|---|---|---|---|
| 41 | Water | 71 | 30 | 66 | 30 | Water | 71 | 15 | Crisp exterior, firm mealy interior. | Fried fresh | Uniform |
| 42 | Water | 71 | 30 | 66 | 30 | | | | Not crisp nor rigid, softens rapidly, soft, mealy, interior, oil soaked | Poor | Blotchy |